United States Patent
Chen et al.

(10) Patent No.: US 9,979,567 B2
(45) Date of Patent: May 22, 2018

(54) EQUALIZATION ENHANCING MODULE, DEMODULATION SYSTEM AND EQUALIZATION ENHANCING METHOD

(71) Applicant: MStar Semiconductor, Inc., Hsinchu Hsien (TW)

(72) Inventors: Chia-Wei Chen, Hsinchu Hsien (TW); Kai-Wen Cheng, Hsinchu Hsien (TW); Ko-Yin Lai, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 49 days.

(21) Appl. No.: 15/172,272

(22) Filed: Jun. 3, 2016

(65) Prior Publication Data

US 2017/0288914 A1    Oct. 5, 2017

(30) Foreign Application Priority Data

Mar. 30, 2016 (TW) .............................. 105110028 A

(51) Int. Cl.
*H03H 7/30* (2006.01)
*H03H 7/40* (2006.01)
*H03K 5/159* (2006.01)
*H04L 25/03* (2006.01)

(52) U.S. Cl.
CPC .............. *H04L 25/03019* (2013.01); *H04L 2025/03636* (2013.01)

(58) Field of Classification Search
CPC .... H03G 3/3052; H03G 3/3068; H03G 3/001; H03G 3/3078; H04L 27/3809

USPC .................................. 375/229–236, 316–352
See application file for complete search history.

(56) References Cited

U.S. PATENT DOCUMENTS

| | | | | |
|---|---|---|---|---|
| 4,355,402 A * | 10/1982 | Kromer, III | ......... | H03G 3/3036 375/229 |
| 4,596,024 A * | 6/1986 | Thomson | .................. | H04L 1/00 375/347 |
| 5,271,042 A * | 12/1993 | Borth | ................ | H04L 25/03318 375/341 |
| 5,970,093 A * | 10/1999 | de Lantremange | ... | H04L 7/0029 375/232 |
| 6,108,375 A * | 8/2000 | Farrokh | ............ | H04L 25/03019 375/235 |
| 6,137,829 A * | 10/2000 | Betts | ................. | H04L 25/03006 329/304 |
| 6,137,833 A * | 10/2000 | Lange | ............... | H04L 25/03343 375/234 |
| 6,154,443 A * | 11/2000 | Huang | ................. | H04B 1/7093 370/210 |

(Continued)

*Primary Examiner* — James M Perez
(74) *Attorney, Agent, or Firm* — Edell, Shapiro & Finnan, LLC

(57) ABSTRACT

An equalization enhancing module includes: a multiplication unit, multiplying a plurality of equalized signals by a scaling coefficient to obtain a plurality of scaled signals; a determination unit, coupled to the multiplication unit, determining whether the plurality of scaled signals are located in a predetermined region to generate a plurality of determination results; a ratio calculating unit, coupled to the determination unit, calculating an inner ratio associated with a ratio of the plurality of scaled signals located in the predetermined region; and a coefficient calculating unit, coupled to the ratio calculating unit, calculating the scaling coefficient according to the inner ratio.

18 Claims, 9 Drawing Sheets

(56) References Cited

U.S. PATENT DOCUMENTS

| | | | |
|---|---|---|---|
| 6,246,717 B1* | 6/2001 | Chen | H04B 3/46 375/226 |
| 6,327,314 B1* | 12/2001 | Cimini, Jr. | G01S 3/72 342/378 |
| 6,505,222 B1* | 1/2003 | Davis | H03M 13/00 375/233 |
| 6,597,733 B2* | 7/2003 | Pollmann | H04L 1/0003 375/222 |
| 6,671,334 B1* | 12/2003 | Kuntz | H04L 7/0029 348/E17.003 |
| 6,862,326 B1* | 3/2005 | Eran | H04L 25/03993 375/229 |
| 6,928,120 B1* | 8/2005 | Zhang | H04L 27/2679 370/464 |
| 7,006,565 B1* | 2/2006 | Endres | H04L 25/03057 375/229 |
| 7,324,437 B1* | 1/2008 | Czylwik | H04L 1/06 370/203 |
| 7,656,941 B2* | 2/2010 | Morgan | H04L 7/04 375/232 |
| 7,773,682 B2* | 8/2010 | Hayashi | H04L 25/03159 375/260 |
| 7,778,357 B2* | 8/2010 | Alcouffe | H04L 25/0202 375/260 |
| 7,796,708 B2* | 9/2010 | Yehudai | H04L 27/38 375/143 |
| 7,912,118 B2* | 3/2011 | Wang | H04L 25/03006 375/229 |
| 7,936,849 B2* | 5/2011 | Cho | H04H 40/18 375/265 |
| 7,978,759 B1* | 7/2011 | Sarrigeorgidis | H04B 7/0413 375/231 |
| 8,064,556 B2* | 11/2011 | Subrahmanya | H04B 1/71057 375/148 |
| 8,077,810 B2* | 12/2011 | Hansen | H03M 13/29 375/262 |
| 8,135,082 B2* | 3/2012 | Choi | H04L 1/0041 375/264 |
| 8,199,864 B1* | 6/2012 | Kim | H04L 27/0014 375/281 |
| 8,238,488 B1* | 8/2012 | Lee | H04L 25/03331 375/262 |
| 8,335,286 B2* | 12/2012 | Mergen | H04B 1/71072 375/148 |
| 8,340,221 B1* | 12/2012 | Cheng | H04L 27/2659 375/316 |
| 8,391,429 B2* | 3/2013 | Mergen | H04B 7/0452 375/148 |
| 8,411,806 B1* | 4/2013 | Lee | H04L 25/03305 375/340 |
| 8,428,106 B2* | 4/2013 | Cairns | H04B 1/712 375/142 |
| 8,451,944 B2* | 5/2013 | Gaur | H04B 7/0426 375/296 |
| 8,675,714 B2* | 3/2014 | Cheung | H04L 25/03885 375/214 |
| 8,681,912 B2* | 3/2014 | Park | H04L 25/0228 375/232 |
| 8,699,607 B2* | 4/2014 | Seller | H04L 27/2649 375/256 |
| 8,774,322 B2* | 7/2014 | Goldfarb | H04B 10/6165 375/226 |
| 8,848,774 B2* | 9/2014 | Zhong | H04L 25/03038 375/232 |
| 8,855,186 B2* | 10/2014 | Tan | H04L 25/03885 375/213 |
| 8,873,681 B2* | 10/2014 | Toufik | H04L 25/03159 375/260 |
| 8,897,385 B2* | 11/2014 | Ramesh | H04L 25/0212 375/144 |
| 8,958,504 B2* | 2/2015 | Warke | H04L 27/0014 375/235 |
| 9,252,821 B2* | 2/2016 | Shor | H04B 1/0475 |
| 9,319,079 B2* | 4/2016 | Eda | H04B 17/00 |
| 9,374,141 B2* | 6/2016 | Murakami | H04B 7/04 |
| 9,401,826 B2* | 7/2016 | Eitel | H04L 25/0238 |
| 9,571,306 B2* | 2/2017 | Liao | H04L 25/022 |
| 2001/0016003 A1* | 8/2001 | Kim | H04L 25/03057 375/232 |
| 2002/0037058 A1* | 3/2002 | Birru | H04L 25/03159 375/340 |
| 2002/0080896 A1* | 6/2002 | Riess | H04L 25/0238 375/341 |
| 2002/0094044 A1* | 7/2002 | Kolze | H04B 1/1027 375/346 |
| 2002/0168002 A1* | 11/2002 | Birru | H03H 21/0012 375/233 |
| 2002/0181549 A1* | 12/2002 | Linnartz | H04L 25/03038 375/142 |
| 2003/0185310 A1* | 10/2003 | Ketchum | H04B 7/005 375/259 |
| 2003/0219085 A1* | 11/2003 | Endres | H03G 3/3052 375/350 |
| 2003/0227968 A1* | 12/2003 | Kim | H04L 25/0305 375/233 |
| 2004/0013189 A1* | 1/2004 | Jayaraman | H04L 25/067 375/233 |
| 2004/0125235 A1* | 7/2004 | Kim | H04N 5/21 348/607 |
| 2004/0190649 A1* | 9/2004 | Endres | H03G 3/3052 375/326 |
| 2005/0041760 A1* | 2/2005 | Yousef | H04L 1/06 375/340 |
| 2005/0169361 A1* | 8/2005 | Yousef | H04L 1/06 375/233 |
| 2005/0259767 A1* | 11/2005 | Garmany | H04B 7/005 375/343 |
| 2005/0265465 A1* | 12/2005 | Hosur | H04L 25/067 375/260 |
| 2005/0265467 A1* | 12/2005 | Dabak | H04L 27/2647 375/260 |
| 2007/0195903 A1* | 8/2007 | Shiue | H04L 25/03019 375/261 |
| 2007/0223565 A1* | 9/2007 | Gaal | H04B 1/71055 375/141 |
| 2007/0248195 A1* | 10/2007 | Lerner | H04L 7/042 375/343 |
| 2007/0258528 A1* | 11/2007 | Kwun | H04L 27/2623 375/260 |
| 2008/0043829 A1* | 2/2008 | Shiue | H04L 25/03019 375/232 |
| 2008/0143580 A1* | 6/2008 | Glazko | H04B 1/1036 455/307 |
| 2008/0187034 A1* | 8/2008 | Liang | H04L 25/03057 375/232 |
| 2008/0219371 A1* | 9/2008 | Hong | H04L 25/022 375/260 |
| 2008/0260052 A1* | 10/2008 | Hayashi | H04L 1/20 375/260 |
| 2008/0273646 A1* | 11/2008 | Ammar | H04L 27/2662 375/371 |
| 2010/0067366 A1* | 3/2010 | Nicoli | H04B 7/0417 370/210 |
| 2010/0220780 A1* | 9/2010 | Peng | H04B 1/525 375/232 |
| 2010/0284478 A1* | 11/2010 | Liao | H04L 25/022 375/260 |
| 2011/0075707 A1* | 3/2011 | Duan | H04L 5/0044 375/144 |
| 2012/0268478 A1* | 10/2012 | Hung | G09G 3/2051 345/596 |
| 2012/0294350 A1* | 11/2012 | Allpress | H04L 25/022 375/229 |
| 2013/0177064 A1* | 7/2013 | Ido | H03M 13/41 375/232 |
| 2013/0259113 A1* | 10/2013 | Kumar | H04L 25/0307 375/233 |

(56) References Cited

U.S. PATENT DOCUMENTS

2015/0163015 A1* 6/2015 Katayama ............. H04L 1/0054
375/285
2016/0373276 A1* 12/2016 Liao ...................... H04L 25/022
2017/0288914 A1* 10/2017 Chen ................. H04L 25/03019

* cited by examiner

EQUALIZATION ENHANCING MODULE, DEMODULATION SYSTEM AND EQUALIZATION ENHANCING METHOD

This application claims the benefit of Taiwan application Serial No. 105110028, filed Mar. 30, 2016, the subject matter of which is incorporated herein by reference.

BACKGROUND OF THE INVENTION

Field of the Invention

The invention relates in general to an equalization enhancing module, a demodulation system and an equalization enhancing method, and more particularly to an equalization enhancing module, a demodulation system and an equalization enhancing method capable of improving a minimum mean square error (MMSE) equalizer.

Description of the Related Art

Digital communication systems are extensively applied in various digital communication devices such as cell phones, set-up boxes (STBs), digital television sticks and wireless network cards. In general, a digital communication system includes a modulation system and a demodulation system. The modulation system modulates bits to be transmitted to transmission symbols, which are transmitted to a channel and then received as reception signals and demodulated by the demodulation system. A reception signal y received by the demodulation system may be represented as y=hs+n, where s represents a transmission symbol generated by the modulation system, h represents a channel response and n represents noise. After receiving the reception signal, the demodulation system utilizes an equalizer included in the demodulation system to eliminate the effect of the channel on the transmission symbol.

In known technologies, a zero forcing equalizer, being an equalizer having a low complexity level, multiplies the reception signal y by a reciprocal of the channel response (denoted as $h^{-1}$). An output signal $x_{ZF}$ of the zero forcing equalizer may be represented as $x_{ZF}=h^{-1}y=s+h^{-1}n$. As such, the zero forcing equalizer eliminates the effect of the channel on the transmission symbol. However, when the channel response is small, the zero forcing equalizer causes an issue of noise enhancement. To prevent the noise enhancement effect caused by the zero forcing equalizer, a minimum mean square error (MMSE) equalizer is one common solution in demodulation systems. An MMSE equalizer multiplies the reception signal y by $$\frac{h\sigma_S^2}{h^2\sigma_S^2+\sigma_N^2},$$

where $\sigma_S^2$ and $\sigma_N^2$ represent the energies of the transmission symbol and the noise, respectively. The output signal $x_{MMSE}$ of the MMSE equalizer may be represented as $$X_{MMSE}=\frac{h\sigma_S^2}{h^2\sigma_S^2+\sigma_N^2}.$$

Thus, regardless of whether the channel response is strong or weak, given that the received signal-to-noise ratio (SNR) is high enough, i.e., when the reception signal energy $h^2\sigma_S^2$ is far greater than the noise energy $$\sigma_N^2, \frac{h\sigma_S^2}{h^2\sigma_S^2+\sigma_N^2}$$

may approximate $h^{-1}$, and the MMSE equalizer may approximate a zero forcing equalizer.

However, when the noise energy $\sigma_N^2$ is stronger, the MMSE causes the energy of the output signal $x_{MMSE}$ to be reduced, in a way that the symbol determination accuracy of the demodulation system is lowered. That is, the reduced energy of the output signal $x_{MMSE}$ of the MMSE equalizer cause a symbol error rate (SER) and a corresponding bit error rate (BER) of the demodulation system to increase, hence degrading the system performance of the demodulation system.

Therefore, there is a need for a solution for improving the prior art.

SUMMARY OF THE INVENTION

The invention is directed to an equalization enhancing module, a demodulation system and an equalization enhancing method for overcoming issues of the prior art.

The present invention discloses an equalization enhancing module including: a multiplication unit, multiplying a plurality of equalized signals by a scaling coefficient to obtain a plurality of scaled signals; a determination unit, coupled to the multiplication unit, determining whether the plurality of scaled signals are located in a predetermined region to generate a plurality of determination results; a ratio calculating unit, coupled to the determination unit, calculating an inner ratio according to the plurality of determination results, wherein the inner ratio is associated with a ratio of the plurality of scaled signals located in the predetermined region; and a coefficient calculating unit, coupled to the ratio calculating unit, calculating the scaling coefficient according to the inner ratio.

The present invention further discloses a demodulation system including: an equalization module, equalizing a plurality of received signals to generate a plurality of equalized signals; a symbol determining module; and an equalization enhancing module, coupled between the equalization module and the symbol determining module. Further, the equalization enhancing module includes: a multiplication unit, multiplying the plurality of equalized signals by a scaling coefficient to obtain a plurality of scaled signals; a determination unit, coupled to the multiplication unit, determining whether the plurality of scaled signals are located in a predetermined region to generate a plurality of determination results; a ratio calculating unit, coupled to the determination unit, calculating an inner ratio according to the plurality of determination results; and a coefficient calculating unit, coupled to the ratio calculating unit, calculating the scaling coefficient according to the inner ratio. Further, the symbol determining module demodulates the plurality of scaled signals.

The present invention further discloses an equalization enhancing method including: multiplying a plurality of equalized signals by a scaling coefficient to obtain a plurality of scaled signals; determining whether the plurality scaled signals are located in a predetermined region to generate a plurality of determination results; calculating an inner ratio according to the plurality of determination results, wherein the inner ratio is associated with a ratio of the plurality of scaled signals located in the predetermined region; and calculating the scaling coefficient according to the inner ratio.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
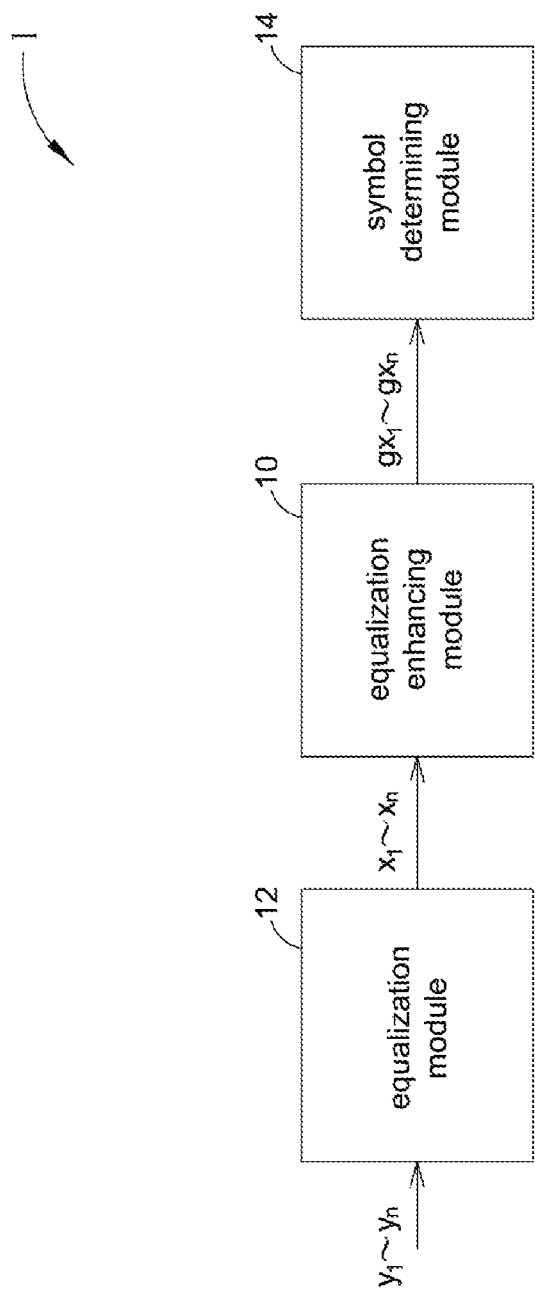
FIG. 1 is a schematic diagram of a demodulation system according to an embodiment of the present invention.

FIG. 1 shows a schematic diagram of a demodulation system 1 according to an embodiment of the present invention. The demodulation system 1 may be an application-specific integrated circuit (ASIC), and includes an equalization module 12, an equalization enhancing module 10 and a symbol determining module 14. The demodulation system 1 receives a plurality of reception signals from a channel. The equalization module 12 equalizes the plurality of reception signals to generate a plurality of equalized signals. The equalization enhancing module 10 multiplies the plurality of equalized signals by a scaling coefficient to generate a plurality of scaled signals to the symbol determining module 14. The symbol determining module 14 may then demodulate the plurality of scaled signals. For example, the equalization module 12 may be a minimum mean square error (MMSE) equalizer. More specifically, between a $1^{st}$ time interval to an $n^{th}$ time interval, the demodulation system 1 receives reception signals $y_1$ to $y_n$ from the equalization module 12. After receiving the reception signals $y_1$ to $y_n$, the equalization module 12 equalizes the reception signals $y_1$ to $y_n$ to generate equalized signals $x_1$ to $x_n$. The equalization enhancing module 10 generates scaling coefficients $g_1$ to $g_n$ according to the equalized signals $x_1$ to $x_n$ (i.e., the output signals that the equalization module 10 receives from the equalization module 12 before the $n^{th}$ time interval), and multiplies the equalized signals $x_1$ to $x_n$ by the scaling coefficients $g_1$ to $g_n$ to generate scaled signals $gx_1$ to $gx_n$, respectively. The symbol determining module 14 may then demodulate the scaled signals $gx_1$ to $gx_n$.

More specifically, in the $1^{st}$ time interval, the equalization enhancing module 10 may set the scaling coefficient $g_1$ to 1 in advance, and the scaled signal $gx_1$ is the equalized signal $x_1$ (i.e., $gx_1=x_1$). In the $2^{nd}$ time interval, the equalization module 10 may generate the scaling coefficient $g_2$ according to the equalized signal $x_1$, and multiply the equalized signal $x_2$ by the scaling coefficient $g_2$ to generate the scaled signal $gx_2$ as $gx_2=g_2x_2$, and so forth. In the $n^{th}$ time interval, the equalization enhancing module 10 may generate the scaling coefficient $g_n$ according to the equalized signals $x_1$ to $x_{n-1}$, and multiply the equalized signal $x_n$ by the scaling coefficient $g_n$ to generate the scaled signal $gx_n$ as $gx_n=g_nx_n$.

It should be noted that, as the equalization module 12 is an MMSE equalizer, when the noise energy gets larger, the energy of the output signal (i.e., the equalized signals $x_1$ to $x_n$) from the equalization module 12 is smaller than the energies of the corresponding reception signals $y_1$ to $y_n$ (i.e., $|x_k|^2<|y_k|^2$). To prevent the smaller energies of the equalized signals $x_1$ to $x_n$ from causing an increased SER or BER of the demodulation system 1, the scaling coefficients $g_1$ to $g_n$ generated by the equalization enhancing module 10 are used to compensate the reduced energy caused by the equalization module 12 (i.e., the MMSE), thereby further improving system performance.

Figure 2:
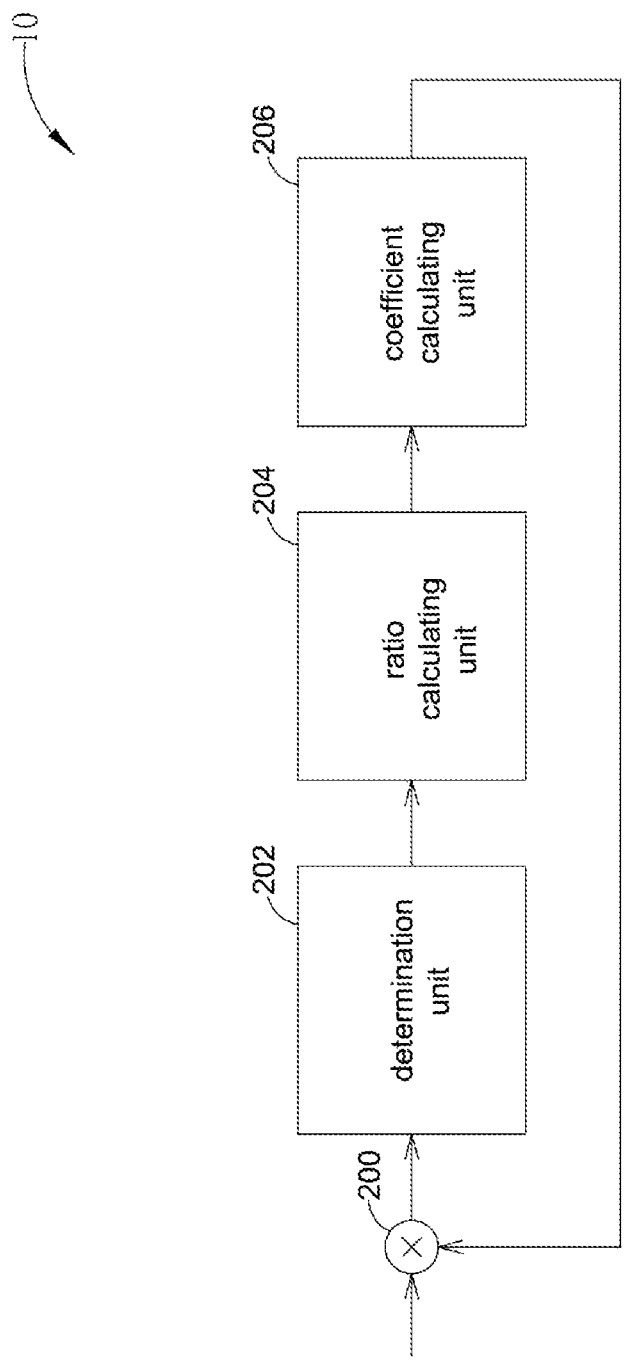
FIG. 2 is a schematic diagram of an equalization enhancing module according to an embodiment of the present invention.

Operation details of how the equalization enhancing module 10 generates the scaling coefficients $g_1$ to $g_n$ (the scaling coefficient $g_1$ is to 1 in advance) are given with reference to FIG. 2 showing a schematic diagram of the equalization enhancing module 10. As shown in FIG. 2, the equalization enhancing module 10 includes a multiplication unit 200, a determination unit 202, a ratio calculating unit 204 and a coefficient calculating unit 206. Between the $1^{st}$ time interval and the $n^{th}$ time interval, the equalization enhancing module 10 receives the equalized signals $x_1$ to $x_n$ from the equalization module 12, and the multiplication unit 200 multiplies the equalized signals $x_1$ to $x_n$ by the scaling coefficients $g_1$ to $g_n$ to obtain the scaled signals $gx_1$ to $gx_n$, respectively. The determination unit 202, coupled to the multiplication unit 200, determines whether constellation points corresponding to the scaled signals $gx_1$ to $gx_n$ are located in a predetermined region R to generate determination results $hit_1$ to $hit_n$. The ratio calculating unit 204, coupled to the determination unit 202, calculates inner ratios $I_1$ to $I_n$ according to the hit results $hit_1$ to $hit_n$. The inner ratios $I_1$ to $I_n$ are associated with the ratios of the scaled signals $gx_1$ to $gx_n$ in the predetermined region R. The coefficient calculating unit 206, coupled to the ratio calculating unit 204, calculates the scaling coefficients $g_1$ to $g_n$ according to the inner ratios $I_1$ to $I_n$, and transmits the scaling coefficients $g_1$ to $g_n$ back to the multiplication unit 200. Thus, in the $n^{th}$ time interval, the multiplication unit 200 may multiply the equalized signal $x_n$ by the scaling coefficient $g_n$ to generate the scaled signal $gx_n$ to the symbol determining module 14, which then demodulates the scaled signal $gx_n$.

More specifically, in the $k^{th}$ time interval, the determination unit 202 determines whether the constellation point corresponding to the scaled signal $gx_k$ is located in the predetermine region R. When the scaled signal $gx_k$ is located in the predetermine region R, the determination result $hit_k$ that the determination unit 202 correspondingly outputs for the scaled signal $gx_k$ is "1". Conversely, when the scaled signal $gx_k$ is not located in the predetermine region R, the determination result $hit_k$ that the determination unit 202 correspondingly outputs for the scaled signal $gx_k$ is "0". The method according to which the determination unit 202 determines whether the constellation point corresponding to the scaled signal $gx_k$ is located in the predetermined region R is not limited. In one embodiment, the determination unit 202 may determine whether an in-phase component and a quadrature component of the scaled signal $gx_k$ are in a predetermine range. When the in-phase component and the quadrature component of the scaled signal $gx_k$ are in the predetermined range, the determination unit 202 determines that the scaled signal $gx_k$ is located in the predetermined region R and outputs a determination result $hit_k=1$, or else the determination unit 202 determines that the scaled signal $gx_k$ is not located in the predetermined region R and outputs a determination result $hit_k=0$. For example, when the reception signals $y_1$ to $y_n$ include quadrature phase shift keying (QPSK) symbol signals, the determination unit 202 may determine whether an absolute value of the in-phase component (denoted as $|Re\{gx_k\}|$) of the scaled signal $gx_k$ is smaller than a predetermined value d, and determine whether an absolute value of the quadrature-phase component (denoted as $|Im\{gx_k\}|$) is smaller than the predetermined value d. When $|Re\{gx_k\}|$ is smaller than the predetermined value d and $|Im\{gx_k\}|$ is smaller than the predetermined value d, the determination unit 202 determines that the scaled signal $gx_k$ is located in the predetermined region R and outputs the determination result $hit_k=1$, or else the determination unit 202 outputs the determination result $hit_k=0$. The determination unit 202 generates the determination results $hit_1$ to $hit_n$, and transmits the determination results $hit_1$ to $hit_n$ to the ratio calculating unit 204.

Figure 3:
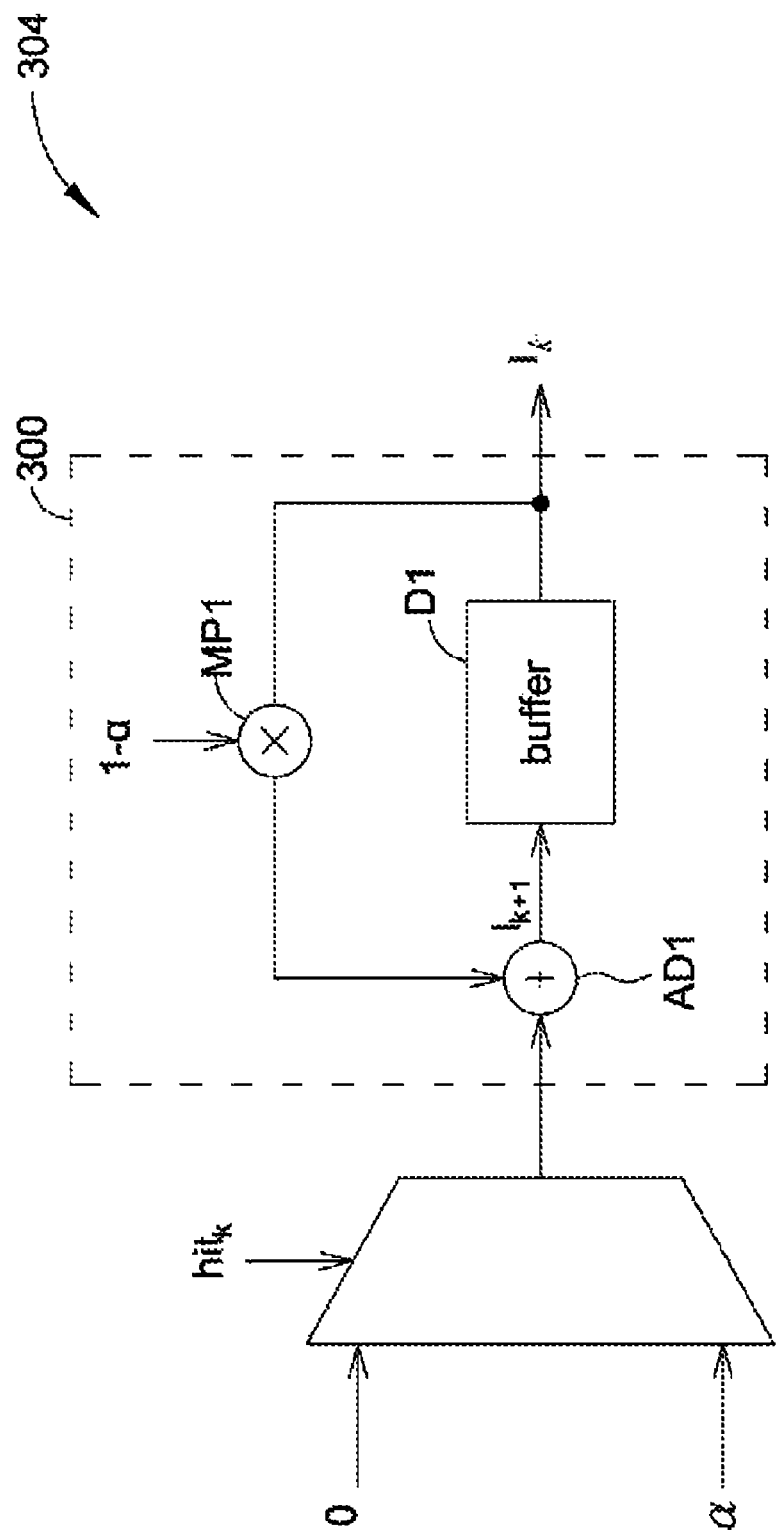
FIG. 3 is a schematic diagram of a ratio calculating unit according to an embodiment of the present invention.

The ratio calculating unit 204 may calculate the inner ratios $I_1$ to $I_n$ using a recursive average method according to the determination results $hit_1$ to $hit_n$. FIG. 3 shows a schematic diagram of a ratio calculating unit 304 according to an embodiment of the present invention. The ratio calculating unit 304 may realize the ratio calculating unit 204, and includes a multiplexer MUX and an averaging unit 300. The multiplexer MUX may be coupled to the determination unit 202, and receives the determination results $hit_1$ to $hit_n$ generated by the determination unit 202. Taking the determination result $hit_k$ of the determination results $hit_1$ to $hit_n$ for example, when the determination result $hit_k$ is 1, a signal S outputted by the multiplexer MUX is an average coefficient α; when the determination result $hit_k$ is 0, the signal S outputted by the multiplexer MUX is 0. In other words, the signal S outputted by the multiplexer MUX may be represented as a $hit_k$.

On the other hand, the averaging unit 300 may calculate the inner ratios $I_1$ to $I_n$ according to the average coefficient α and the determination results $hit_1$ to $hit_n$. More specifically, the averaging unit 300 includes a multiplier MP1, an adder AD1 and a buffer D1. The adder AD1 is coupled to the multiplexer MUX, the buffer D1 is coupled to the adder AD1, and the multiplier MP1 is coupled between the adder AD1 and the buffer D1. An example between the $k^{th}$ time interval and the $(k+1)^{th}$ time interval is given for illustrations below. In the $k^{th}$ time interval, an output from the buffer D1 is an inner ratio $I_k$ (corresponding to a buffer inner ratio); the multiplier MP1 multiples the inner ratio $I_k$ by a coefficient $(1-α)$ to generate a multiplication result R1 and transmits the multiplication result R1 to the adder AD1. The multiplication result R1 may be represented as $R1=(1-α)I_k$. The adder AD1 adds the signal S and the multiplication result R1 to obtain an addition result R2. The addition result R2 may be represented as $R2=αhit_k+(1-α)I_k$, and is the inner ratio $I_{k+1}$. Further, the ratio calculating unit 304 stores the addition result R2 in the buffer D1. Thus, in the $(k+1)^{th}$ time interval, the buffer D1 may output the inner ratio $I_{k+1}$. In other words, the averaging unit 300 of the ratio calculating unit 304 is for realizing $I_{k+1}=αhit_k+(1-α)I_k$, where the integer k may be a positive integer between 1 and n−1. As such, after receiving the determination results $hit_1$ to $hit_n$ in the $1^{st}$ time interval to the $(n-1)^{th}$ time interval, the ratio calculating unit 304 may generate the inner ratios $I_1$ to $I_n$ in the $1^{st}$ to the $n^{th}$ time intervals according to the determination results $hit_1$ to $hit_n$, where the inner ratio $I_1$ may be set to a predetermined value in advance. Meanwhile, in the $1^{st}$ to the $n^{th}$ time intervals, the ratio calculating unit 304 transmits the inner ratios $I_1$ to $I_n$ to the coefficient calculating unit 206.

In the $1^{st}$ to the $n^{th}$ time intervals, the coefficient calculating unit 206 determines whether the inner ratios $I_1$ to $I_n$ are greater than a predetermined ratio IR, respectively, to calculate the scaling coefficients $g_2$ to $g_n$, such that the inner ratio gradually approximates (converges) to the predetermined ratio IR. Taking the inner ratio $I_k$ received in the $k^{th}$ time interval for example, when the inner ratio $I_k$ is greater than the predetermined ratio IR, the coefficient calculating unit 206 calculates the scaling coefficient $g_{k+1}$ as the scaling coefficient $g_k$ (corresponding to the buffered scaling coefficient) added by a first predetermined value $Δg_1$ (i.e., $g_{k+1}=g_k+Δg_1$). Conversely, when the inner ratio $I_k$ is smaller than the predetermined ratio IR, the coefficient calculating unit 206 calculates the scaling coefficient $g_{k+1}$ as the scaling coefficient $g_k$ subtracted by a second predetermined value $Δg_2$ (i.e., $g_{k+1}=g_k-Δg_2$). Wherein, both of the first predetermined value $Δg_1$ and the second predetermined value $Δg_2$ are greater than zero.

Figure 4:
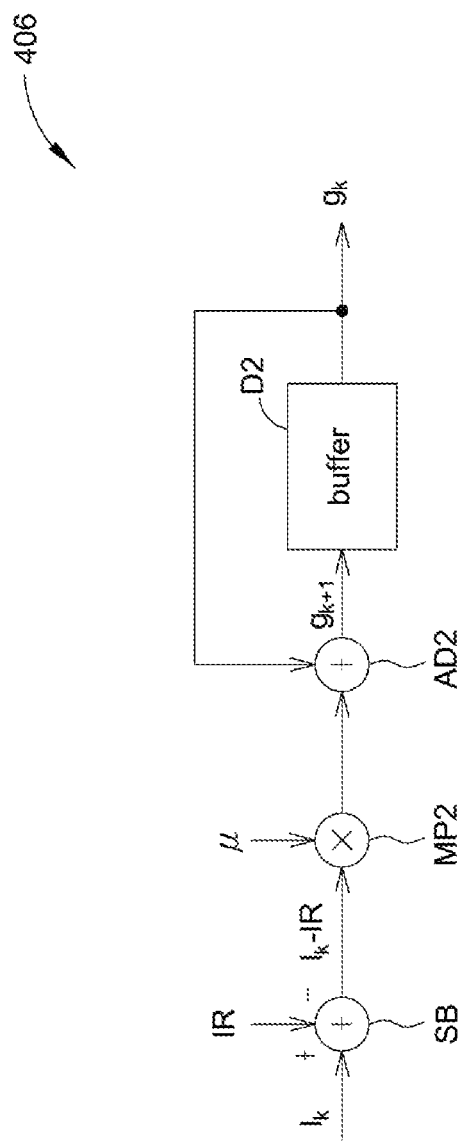
FIG. 4 is a schematic diagram of a coefficient calculating unit according to an embodiment of the present invention.

FIG. 4 shows a schematic diagram of a coefficient calculating unit 406 according to an embodiment of the present invention. Referring to FIG. 4, the coefficient calculating unit 406 may be used to realize the coefficient calculating unit 206, and includes a subtractor SB, a multiplier MP2, an adder AD2 and a buffer D2. The subtractor SB, coupled to the ratio calculating unit 204, receives the inner ratio generated by the ratio calculating unit 204. The multiplier MP2 is coupled to the subtractor SB, the adder AD2 is coupled between the adder MP2 and the buffer D2, and the buffer D2 further outputs a feedback to the adder AD2. Similarly, an example between the $k^{th}$ time interval and the $(k+1)^{th}$ time interval is given for illustrations. In the $k^{th}$ time interval, the subtractor SB receives the inner ratio $I_k$ generated by the ratio calculating unit 204, and subtracts the inner ratio $I_k$ by the predetermined ratio IR to generate a subtraction result R3. The subtraction result R3 may be represented as $R3=I_k-IR$. The multiplier MP2 multiplies the subtraction result (i.e., $I_k-IR$) by an adjustment coefficient μ to generate a multiplication result R4 and transmits the multiplication result R4 to the adder AD2. The multiplication result R4 may be represented as $R4=μ(I_k-IR)$. At this point (i.e., in the $k^{th}$ time interval), the output of the buffer D2 is the scaling coefficient $g_k$ (corresponding to the buffer scaling coefficient), and the adder AD2 adds the multiplication result R4 and the scaling coefficient $g_k$ to generate an addition result R5. The addition result R5 may be represented as $R5=g_k+μ(I_k-IR)$, and is the scaling coefficient $g_{k+1}$. Further, the coefficient calculating unit 406 stores the addition result R5/scaling coefficient $g_{k+1}$ to the buffer D2. Thus, in the $(k+1)^{th}$ time interval, the buffer D2 may output the scaling coefficient $g_{k+1}$. In other words, the coefficient calculating unit 406 realizes $g_{k+1}=g_k+μ(I_k-IR)$, where the integer k may be a positive integer between 1 and (n−1). As such, the coefficient calculating unit 206 calculates the inner ratios $I_1$ to $I_{n-1}$ in the $1^{st}$ to $(n-1)^{th}$ time intervals, and calculates the scaling coefficients $g_2$ to $g_n$ (where the scaling coefficient is set to 1 in advance), respectively, to cause the inner ratio to converge to the predetermined ratio IR.

Figure 5:
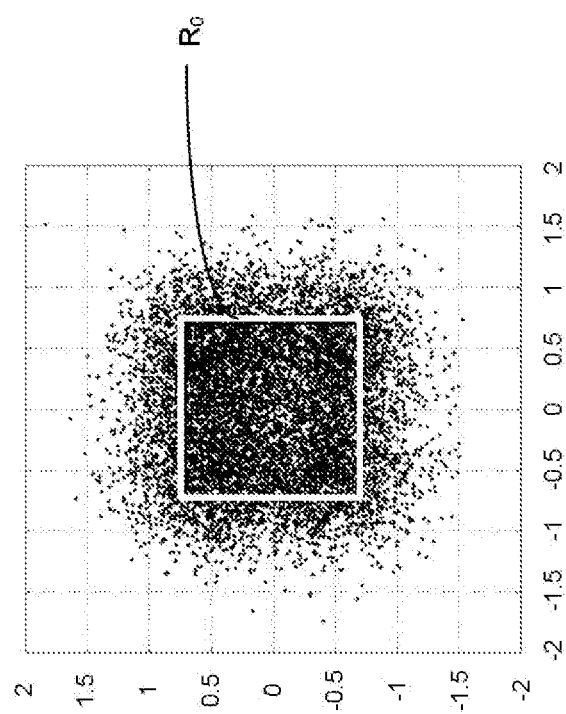
FIG. 5 is a constellation diagram of a plurality of equalized signals.
Figure 6:
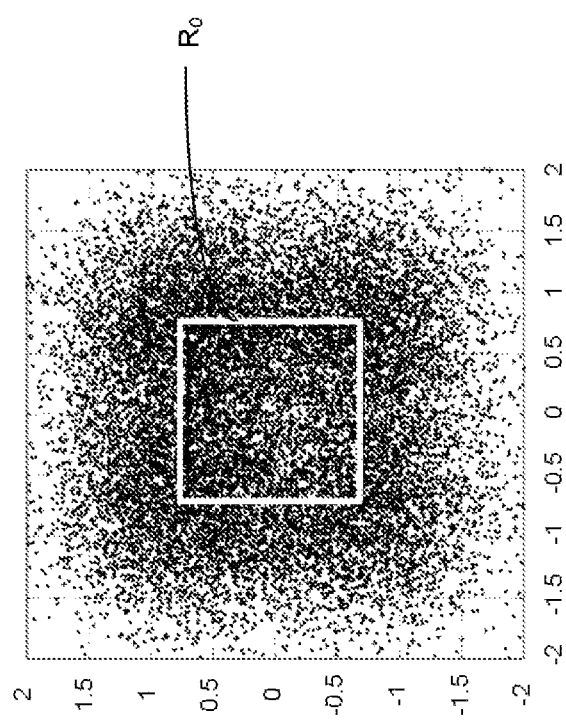
FIG. 6 is a constellation diagram of a plurality of scaled signals.

Thus, the equalization enhancing module 10 may generate the scaling coefficients to compensate the reduced energy caused by the equalization module 12 (i.e., the MMSE). FIG. 5 shows a constellation diagram of a plurality of equalized signals outputted by the equalization module 12. FIG. 6 shows a constellation diagram of a plurality of scaled signals generated by the equalization enhancing module 10. Due to the reduced energy caused by the equalization module 12, a ratio of the plurality of equalized signals located in a predetermined region $R_0$ is 52%, and the SER or BER may be increased if demodulation is directly performed on the plurality of equalized signals outputted by the equalization module 12. In comparison, through the scaling coefficients outputted by the equalization enhancing module 10, the constellation points of the plurality of scaled signals may disperse outwards, such that a ratio of the plurality of the scaled signals located in the predetermined region $R_0$ is lowered to 25%. By demodulating the scaling coefficients generated by the equalization enhancing module 10, the SER or BER may be reduced to enhance the performance of the demodulation system 1.

Figure 7:
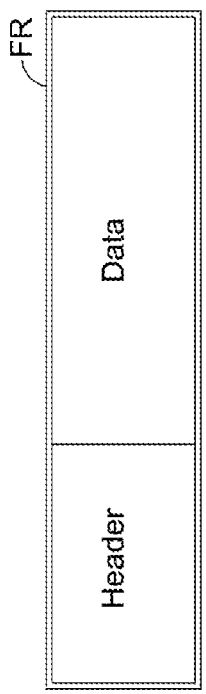
FIG. 7 is a schematic diagram of a frame.

On the other hand, the demodulation system 1 may demodulate a frame FR. More specifically, the frame FR may include a header sub-frame Header and a data sub-frame Data, as shown in FIG. 7. The frame FR may be transmitted to a channel from a transmitter, and the demodulation system 1 may receive the reception signals $y_1$ to $y_N$ corresponding to the frame FR from the channel. The reception signals $y_1$ to $y_n$ may correspond to the header sub-frame Header, and the reception signals $y_{n+1}$ to $y_N$ may correspond to the data sub-frame Data. The demodulation system 1 may generate the scaling coefficient $g_n$ (i.e., the last updated scaling coefficient) according to the reception signals $y_1$ to $y_n$ using the above method, and demodulate the subsequent reception signals $y_{n+1}$ to $y_N$ corresponding to the data sub-frame Data according to the scaling coefficient $g_n$. Thus, the information included in the frame FR may be more accurately demodulated to enhance system performance.

Figure 8:
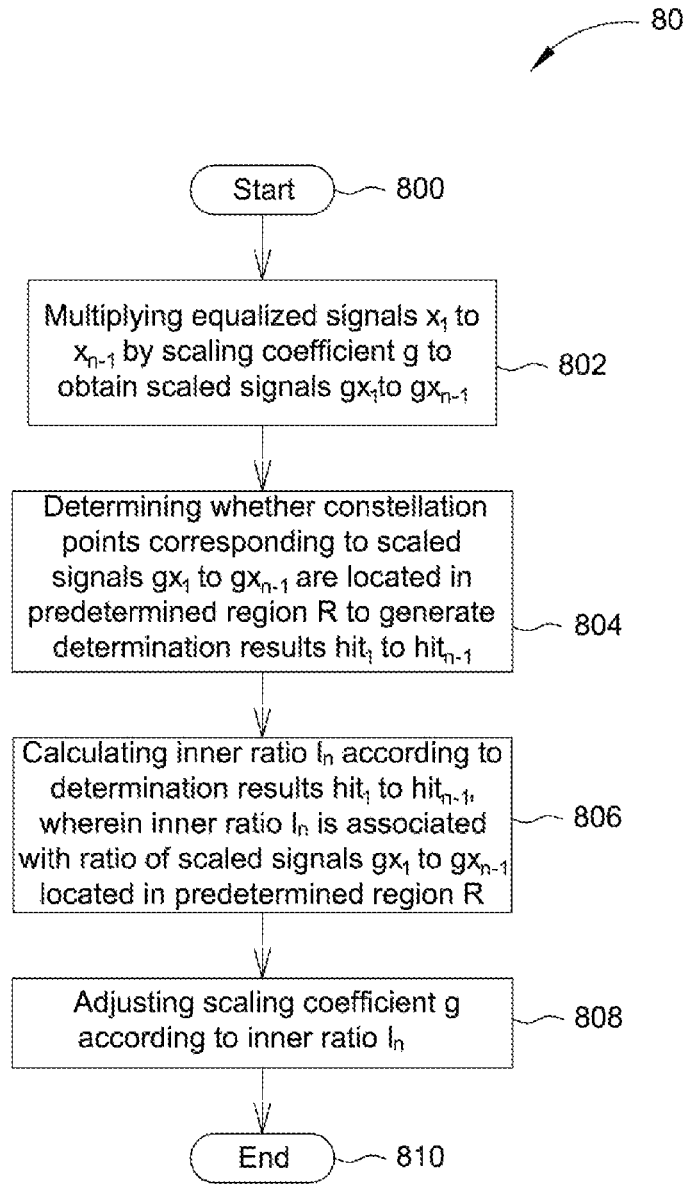
FIG. 8 is a schematic diagram of a demodulation system according to an embodiment of the present invention.

The operation process of how the equalization enhancing module generates the scaled signals may be further concluded to an equalization enhancing process 80, as shown in FIG. 8. FIG. 8 shows a schematic diagram of the equalization enhancing process 80 according to an embodiment of the present invention. The equalization enhancing process 80, which may be performed by an equalization enhancing module, includes following steps.

In step 800, the equalization enhancing process 80 begins.

In step 802, equalized signals $x_1$ to $x_{n-1}$ are multiplied by a scaling coefficient g to obtain scaled signals $gx_1$ to $gx_{n-1}$.

In step 804, it is determined whether constellation points corresponding to the scaled signals $gx_1$ to $gx_{n-1}$ are located in a predetermined region R to generate determination results $hit_1$ to $hit_{n-1}$.

In step 806, an inner ratio $I_n$ is calculated according to the determination results $hit_1$ to $hit_{n-1}$, wherein the inner ratio $I_n$ is associated with a ratio of the scaled signals $gx_1$ to $gx_{n-1}$ located in the predetermined region R.

In step 808, the scaling coefficient g is adjusted according to the inner ratio $I_n$.

In step 810, the equalization enhancing process 80 ends.

In the equalization enhancing process 80, the value of the scaling coefficient g may vary as the time changes. That is, the value of the scaling coefficient in a $1^{st}$ time interval to an $n^{th}$ time interval may be scaling coefficients $g_1$ to $g_n$, respectively. Further, in step 806, the equalization enhancing module may calculate the inner ratio $I_n$ by a recursive average method, i.e., calculating the inner ratio $I_n$ as $$I_n = \frac{1}{n-1}\sum_{k=1}^{n-1} hit_k,$$

which is encompassed within the scope of the present invention.

Further, in step 808, the equalization enhancing module may determine whether the inner ratio $I_n$ is greater than a predetermined ratio IR. When the inner ratio $I_n$ is greater than the predetermined ratio IR, the equalization enhancing module calculates the scaling coefficient g as the scaling coefficient $g_{-1}$ added by a first predetermined value $\Delta g_1$ (i.e., $g=g_{-1}+\Delta g_1$). Conversely, when the inner ratio $I_n$ is smaller than the predetermined ratio IR, the equalization enhancing module calculates the scaling coefficient g as the scaling coefficient $g_{-1}$ subtracted by a second predetermined value $\Delta g_2$ (i.e., $g=g_{-1}-\Delta g_2$). Further, the equalization enhancing module may also calculate the scaling coefficient g as $g=g_{-1}+\mu(I_n-IR)$, which is also encompassed within the scope of the present invention. Operation details of the remaining part of the equalization enhancing process 80 may be referred from the foregoing paragraphs, and shall be omitted herein.

Figure 9:
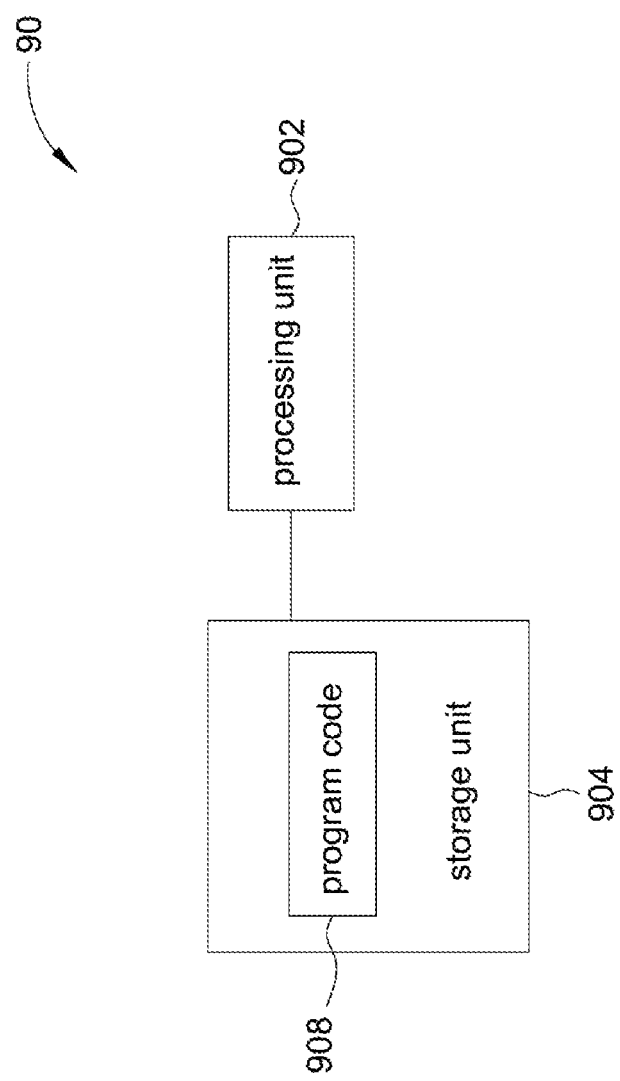
FIG. 9 is a schematic diagram of an equalization enhancing module according to an embodiment of the present invention.

Further, the equalization enhancing module is not limited to being realized by an ASIC. FIG. 9 shows a schematic diagram of an equalization enhancing module 90 according to an embodiment of the present invention. The equalization enhancing module 90 includes a processing unit 902 and a storage unit 904. The equalization enhancing process 80 may be coded to a program code 908 and stored in the storage unit 904 to instruct the processing unit 902 to perform the equalization enhancing process 80. For example but not limited to, the processing unit 902 may be a central processing unit (CPU), a digital signal processor (DSP) or a microprocessor. For example but not limited to, the storage unit 904 may be a read-only memory (ROM) or a non-volatile memory, e.g., an electrically-erasable programmable read-only memory (EEPROM) or a flash memory.

It should be noted that, one person skilled in the art may modify the foregoing non-limiting embodiments used for illustrating the concept of the present invention. For example, although QPSK symbol signals are given as an example of the reception signals $y_1$ to $y_n$ in the foregoing embodiments, the reception signals $y_1$ to $y_n$ may also be quadrature amplitude modulation (QAM), phase shift keying (PSK) or amplitude phase shift keying (APSK) symbol signals, which are also encompassed within the scope of the present invention. Further, the equalization module 12 is not limited to being an MMSE equalizer. Given that the energy of the equalized signals generated by the equalization module 12 is not greater than the energy of the reception signals generated by the equalization module 12, the equalization enhancing module of the present invention may be applied to compensate the reduced energy caused by the equalization module 12 to further improve the system performance of the demodulation system 1.

It is known from the above that, in the present invention, the scaling coefficient is adjusted according to the ratio of the scaled signals located in a predetermined region to compensate a reduced energy caused by the equalization module (the MMSE equalizer), thereby further reducing the SER or BER and enhancing the performance of the demodulation system.

While the invention has been described by way of example and in terms of the preferred embodiments, it is to be understood that the invention is not limited thereto. On the contrary, it is intended to cover various modifications and similar arrangements and the scope of the appended claims therefore should be accorded the broadest interpretation so as to encompass all such modifications and similar arrangements and procedures.

What is claimed is:

1. An equalization enhancing module, comprising:
   a multiplication unit, multiplying each one of a plurality of equalized signals by a corresponding scaling coefficient to obtain a plurality of scaled signals;
   a determination unit, coupled to the multiplication unit, determining whether constellation points corresponding to the plurality of scaled signals are located in a predetermined region to generate a plurality of determination results;
   a ratio calculating unit, coupled to the determination unit, calculating an inner ratio according to the plurality of determination results, wherein the inner ratio is associated with a ratio of the plurality of scaled signals located in the predetermine region; and
   a coefficient calculating unit, coupled to the ratio calculating unit, calculating the scaling coefficient according to the inner ratio.

2. The equalization enhancing module according to claim 1, wherein the ratio calculating unit comprises:
   an averaging unit, calculating the inner ratio according to the plurality of determination results and an average coefficient.

3. The equalization enhancing module according to claim 2, wherein the averaging unit comprises:
   a first multiplier, multiplying a buffer inner ratio by a first coefficient to generate a first multiplication result, wherein the first coefficient is 1 subtracted by the average coefficient;
   a first adder, coupled to the first multiplier, adding the first multiplication result and a first signal to generate a first addition result, wherein the first signal is associated with one determination result of the plurality of determination results and the average coefficient; and
   a first buffer, coupled to the first adder, outputting the inner ratio as the first addition result.

4. The equalization enhancing module according to claim 3, wherein the first signal is the average coefficient when the determination result indicates that a scaled signal of the plurality of scaled signals is located in the predetermined region, and the first signal is "0" when the determination result indicates that the scaled signal is outside the predetermined region.

5. The equalization enhancing module according to claim 4, wherein the averaging unit further comprises a multiplexer coupled to the first adder.

6. The equalization enhancing module according to claim 1, wherein the coefficient calculating unit calculates the scaling coefficient as a buffered scaling coefficient added by a first predetermined value when the inner ratio is greater than a predetermined ratio.

7. The equalization enhancing module according to claim 6, wherein the coefficient calculating unit calculates the scaling coefficient as the buffered scaling coefficient subtracted by a second predetermined value when the inner ratio is smaller than the predetermined ratio.

8. The equalization enhancing module according to claim 6, wherein the coefficient calculating unit comprises:
   a subtractor, generating a subtraction result of the inner ratio and the predetermined ratio;
   a second multiplier, coupled to the subtractor, multiplying the subtraction result by an adjustment coefficient to generate a second multiplication result;
   a second adder, coupled to the second multiplier, adding the second multiplication result and the buffered scaling coefficient to generate a second addition result; and
   a second buffer, coupled to the second adder, outputting the scaling coefficient as the second addition result.

9. A demodulation system, comprising:
   an equalization module, equalizing a plurality of reception signals to generate a plurality of equalized signals;
   a symbol determining module; and
   an equalization enhancing module, coupled between the equalization module and the symbol determining module, comprising:
      a multiplication unit, multiplying each one of a plurality of equalized signals by a corresponding scaling coefficient to obtain a plurality of scaled signals;
      a determination unit, coupled to the multiplication unit, determining whether the plurality of scaled signals are located in a predetermined region to generate a plurality of determination results;
      a ratio calculating unit, coupled to the determination unit, calculating an inner ratio according to the plurality of determination results;
      a coefficient calculating unit, coupled to the ratio calculating unit, calculating the scaling coefficient according to the inner ratio;
   wherein, the symbol determining module demodulates the plurality of scaled signals.

10. The demodulation system according to claim 9, wherein the equalization module is a minimum mean square error (MMSE) equalizer.

11. The demodulation system according to claim 9, wherein energies of the plurality of equalized signals generated by the equalization module are not greater than energies of a plurality of corresponding receptions signals.

12. An equalization enhancing method, capable of enhancing performance of a demodulation system, comprising:
    multiplying each one of a plurality of equalized signals by a corresponding scaling coefficient to obtain a plurality of scaled signals;
    determining whether constellation points corresponding to the plurality of scaled signals are located in a predetermined region to generate a plurality of determination results;
    calculating an inner ratio according to the plurality of determination results, wherein the inner ratio is associated with a ratio of the plurality of scaled signals located in the predetermined region; and
    calculating the scaling coefficient according to the inner ratio to cause the inner ratio to approximate a predetermined ratio.

13. The equalization enhancing method according to claim 12, wherein the step of calculating the inner ratio according to the plurality of determination results comprises:
    calculating the inner ratio according to the plurality of determination results and an average coefficient.

14. The equalization enhancing method according to claim 13, wherein the step of calculating the inner ratio according to the plurality of determination results and the average coefficient comprises:
    multiplying a buffer inner ratio by a first coefficient to generate a first multiplication result, wherein the first coefficient is 1 subtracted by the average coefficient;
    adding the first multiplication result and a first signal to generate a first addition result, wherein the first signal is associated with one determination result of the plurality of determination results and the average coefficient; and
    outputting the inner ratio as the first addition result.

15. The equalization enhancing method according to claim 14, wherein the first signal is generated as the average coefficient when the determination result indicates that a scaled signal of the plurality of scaled signals is located in the predetermined region, and the first signal is generated as "0" when the determination result indicates that the scaled signal is outside the predetermined region.

16. The equalization enhancing method according to claim 12, wherein the step of calculating the scaling coefficient according to the inner ratio comprises:
   calculating the scaling coefficient as a buffered scaling coefficient added by a first predetermined value when the inner ratio is greater than a predetermined ratio.

17. The equalization enhancing method according to claim 16, wherein the step of calculating the scaling coefficient according to the inner ratio further comprises:
   calculating the scaling coefficient as the buffered scaling coefficient subtracted by a second predetermined value when the inner ratio is smaller than the predetermined ratio.

18. The equalization enhancing method according to claim 16, wherein the step of calculating the scaling coefficient according to the inner ratio comprises:
   generating a subtraction result of the inner ratio and the predetermined ratio;
   multiplying the subtraction result by an adjustment coefficient to generate a second multiplication result;
   adding the second multiplication result and the buffered scaling coefficient to generate a second addition result; and
   obtaining the scaling coefficient as the second addition result.

* * * * *